(12) United States Patent
Depaolantonio

(10) Patent No.: US 7,224,898 B1
(45) Date of Patent: May 29, 2007

(54) CARRIER CLASS DWDM OPTICAL NETWORK AUDIT TOOL

(75) Inventor: Joseph Depaolantonio, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 445 days.

(21) Appl. No.: 09/863,233

(22) Filed: May 21, 2001

(51) Int. Cl.
H04B 10/08 (2006.01)

(52) U.S. Cl. .............................. 398/25; 398/9; 398/34

(58) Field of Classification Search ............... 398/9, 398/10, 22–25, 34, 58–60, 66, 68, 70–71, 398/73, 109, 140, 165, 168, 167.5, 166, 14, 398/17, 30, 31, 32, 33
See application file for complete search history.

(56) References Cited

U.S. PATENT DOCUMENTS

| | | | | |
|---|---|---|---|---|
| 5,367,394 A * | 11/1994 | Chuter et al. | ................. | 398/33 |
| 5,561,542 A * | 10/1996 | Kosugi et al. | ................ | 398/58 |
| 5,663,819 A * | 9/1997 | Lewis | ......................... | 398/58 |
| 5,968,122 A | 10/1999 | Schlosser et al. | ........... | 709/223 |
| 5,995,256 A * | 11/1999 | Fee | .............................. | 398/34 |
| 6,026,500 A | 2/2000 | Guido et al. | .................. | 714/26 |
| 6,072,609 A * | 6/2000 | Masuda | ........................ | 398/27 |
| 6,115,743 A | 9/2000 | Cowan et al. | .............. | 709/224 |
| 6,154,273 A * | 11/2000 | Suzuki | ....................... | 356/73.1 |
| 6,229,540 B1 | 5/2001 | Tonelli et al. | .............. | 345/356 |
| 6,233,074 B1 * | 5/2001 | Lahat et al. | .................. | 398/79 |
| 6,344,910 B1 * | 2/2002 | Cao | ............................. | 398/34 |
| 6,377,725 B1 * | 4/2002 | Stevens et al. | ............... | 385/24 |
| 6,456,306 B1 | 9/2002 | Chin et al. | ................... | 345/810 |
| 6,470,385 B1 | 10/2002 | Nakashima et al. | ........ | 709/224 |
| 6,529,473 B1 | 3/2003 | Bavant et al. | .............. | 370/217 |
| 6,583,901 B1 * | 6/2003 | Hung | .......................... | 398/79 |
| 6,584,535 B1 | 6/2003 | Oullet | ........................ | 710/305 |
| 6,678,475 B1 * | 1/2004 | Turban et al. | ................ | 398/79 |
| 6,834,304 B1 * | 12/2004 | Nisbet et al. | .............. | 709/224 |
| 2001/0012141 A1* | 8/2001 | Takai et al. | ................. | 359/110 |
| 2002/0069275 A1* | 6/2002 | Tindal | ........................ | 709/223 |

* cited by examiner

*Primary Examiner*—Christina Leung
(74) *Attorney, Agent, or Firm*—Marger Johnson & McCollom, P.C.

(57) ABSTRACT

An automated audit tool is disclosed for auditing a Carrier-Class, DWDM optical network, including its infrastructure devices. The automated audit tool performs a process that includes the steps of transmitting an initial query code to hardware devices in the DWDM optical network in order to determine the network configuration, receiving responses to the first query code that enable the determination of configuration, transmitting a second query code to the hardware devices that is based on the information in the first response, receiving the responses to the second query code and producing a report of the responses and the analysis.

36 Claims, 13 Drawing Sheets

400 TABLE OF EXEMPLARY COMMANDS AND EXPLANATIONS

| Net Audit (Version X) | | | | | | | | Net Advisor |
|---|---|---|---|---|---|---|---|---|
| Command | Key Variable(s) | Section | Sub Section | MIB | Poll Freq | Net Info | Net Advice | Include |
| RTRV-CNFGRN:::001; | Network element Name | Configuration | System | | Weekly | Retrieves the name of the network element | | |
| RTRV-VER::CMP_W-01-01-15:002; | TL1 Agent Software Version | Configuration | System | | Weekly | Retrieves the software version of the TL1 agent that is running on the network element. The software version, SCC version, BIOS version and serial number are returned. | | |
| RTRV-IPADDR::CMP_W-01-01-15::003; | IP Address | Configuration | System | | Weekly | Retrieves the IP address of the network element. Additionally returns the subnet mask and gateway addresses. | | |
| RTRV-NETYPE:::004; | NE Type | Configuration | System | | Weekly | Retrieves the network element vendor name, element model and element type. the supported element types are TERMINAL, OLA, OADM and LEM sites. Must be running version 1.3.0 or greater of the TL1 agent to use this command. | | |
| RTRVEQPT:SOFTLINE2:ALL:004; | Board Name and board Position | Configuration | System | | Weekly | Retrieves the presence and status of equipment and facilities for the network element. | | |
| RTRV-VER:SOFTLINE2:ALL:005 | Software Version of Each Card. | Configuration | System | | Weekly | Retrieves the software version running on each board. The software version, SCC version, Bios version and serial number are returned. | | |
| RTRV-WRKP::PRE_L-01-01-04:005; | Working Point Values | Fault | System | | | Retrieves the working point of various points of measure for the PRE-L board. If no working point value is returned, it means that it is currently set to zero. | | √ |
| RTRV-PM: SOFTLINE2:PRE_L-01-01-04:006::-999-UP; | Current retrieved value | Fault | System | | Daily | Retrieves the current value of various points of measure for the PRE_L board. | | √ |
| RTRV-TH::PRE_L-01-01-04:007; | Threshold value | Fault | System | | Daily | Retrieves threshold values of various points of measure for the PRE_L board. Thresholds could include Degrade, Fail, High, Low Medium and High Medium. | Verify input power, output power and laser current values and thresholds. If temperature is related, verify environmental conditions. Check for associated alarm status messages. Fault isolate to the board level | √ |
| RTRV-TH::8WD_B-01-01-07::001; | Temperature values | Fault | System | | Daily | Retrieves threshold values of various points of measure for the 8WD board. Thresholds could include Degrade, Fail, High, Low Medium and High Medium. | Verify environmental conditions. Check for associated alarm status messages. Fault isolate to the board level. | √ |
| RTRV-WRKP::8WD_B-01-01-07::002; | Temperature working points | Fault | System | | Daily | Retrieves the working point of various points of measure for the 8wd board. If no working point value is returned, it means that it is currently set to zero. | | √ |
| RTRV-PM::8WD_B-01-01-07::003; | Temperature actual value | Fault | System | | Daily | Retrieves the current value of various points of measure for the 8WD board. | | √ |
| RTRV-TH::TPA_R-01-01-01:001; | Laser Power | Fault Performance | System | | Daily | Retrieves threshold values of various points of measure for the TPA board. Thresholds could include Degrade, Fail, High, Low Medium and High Medium. | Verify input power, output power and laser current values and thresholds. If temperature is related, verify environmental conditions. Check for associated alarm status messages. Fault isolate to the board level | √ |
| RTRV-WRKP::TPA_R-01-01-01:002; | Laser Power | Fault Performance | System | | Daily | Retrieves the working point of various points of measure for the TPA board. If no working point value is returned, it means that it is currently set to zero. | | √ |

FIGURE 4A

400 TABLE OF EXEMPLARY COMMANDS AND EXPLANATIONS (Cont.)

| Command | Key Variable(s) | Section | Sub Section | MIB | Poll Freq | Net Info | Net Advice | Net Advisor Include |
|---|---|---|---|---|---|---|---|---|
| | | | | | Net Audit (Version X) | | | |
| RTRV-PM: TPA_R-01-01-01:003::,-999-UP; | Laser current and output | Fault Performance | System | | Daily | Retrieves the current value of various points of measure for the TPA board. | | √ |
| RTRV-TH::WCM_EM_N05-01-03-05:001; | Laser input and output power | Fault Performance | System | | Daily | Retrieves threshold values of various points of measure for the TPA board. Thresholds could include Degrade, Fail, High, Low Medium and High Medium. | Verify input power, output power and laser current values and thresholds. Check for associated alarm status messages. Fault isolate to the board level. | √ |
| RTRV-WRKP::WCM_EM_N05-01-03-05:002; | Laser temperature | Fault Performance | System | | Daily | Retrieves the working point of various points of measure for the WCM board. If no working point value is returned, it means that it is currently set to zero. | | √ |
| RTRV-PM::WCM_EM_N05-01-03-05:003::,-999-UP; | Laser current, power and output | Fault Performance | System | | Daily | Retrieves the current value of various points of measure for the WCM board. | | √ |
| RTRV-PM: LEM_EM_M12-01-03-12:001::,-999-UP; | Power, current and limits. | Fault Performance | System | | Daily | Retrieves the current value of various points of measure for the LEM board. | | √ |
| RTRV-WRKP::SCF_W-01-03-17:001; | Fan, Current and Battery Levels | Fault | System | | Daily | Retrieves the working point of various points of measure for the SCF board. If no working point value is returned, it means that it is currently set to zero or no working points exist for the board type. | | √ |
| RTRV-PM: SCF_W-01-03-17:002::,-999-UP; | Fan, Current and Battery Levels | Fault | System | | Daily | Retrieves the current value of various points of measure for the SCF board. | | √ |
| RTRV-TH::SCF_W-01-03-17:003; | Fan, Current and Battery Limits | Fault | System | | Daily | Retrieves threshold values of various points of measure for the SCF board. Thresholds could include Degrade, Fail, High, Low Medium and High Medium. | Verify current, DC converter and battery control values and thresholds. Check for associated alarm status messages. Fault isolate to the board level. | √ |
| RTRV-WRKP::IOC-01-01-16:001; | Analog input levels | Configuration | System | | Daily | Retrieves the working point of various points of measure for the IOC board. If no working point value is returned, it means that it is currently set to zero. | | √ |
| RTRV-PM::IOC-01-01-16:002,-999-UP; | Analog input levels | Configuration | System | | Daily | Retrieves the current value of various points of measure for the IOC board. | | √ |
| RTRV-TH::IO-01-01-16:003; | Analog input levels | Configuration | System | | Daily | Retrieves threshold values of various points of measure for the IOC board. Thresholds could include Degrade, Fail, High, Low Medium and High Medium. | | √ |
| RTRV-TH::LSM_W-01-01-13:001; | Laser power output | Fault Performance | System | | Daily | Retrieves threshold values of various points of measure for the IOC board. Thresholds could include Degrade, Fail, High, Low Medium and High Medium. | Verify the analogic input and output values and thresholds. Check for associated alarm status messages. Fault isolate to the board level. | √ |
| RTRV-PM::LSM_W-01-01-13:002::,-999-UP; | Laser current, power and output. | Fault Performance | System | | Daily | Retrieves the current value of various points of measure for the LSM board. | | √ |
| RTRV-WRKP::LSM_W-01-01-13:003; | Laser temp and power limits | Fault Performance | System | | Daily | Retrieves the working point of various points of measure for the LSM board. If no working point value is returned, it means that it is currently set to zero. | | √ |
| RTRV-ALM::ALL:001; | Retrieves alarm status | Fault | System Media | | Hourly | Retrieves the alarm or alarms associated with all board types of the specified network element. | Check alarms messages per network element and network wide. Look for common cause of multiple alarms. Verify the current values and threshold values for help in troubleshooting. Fault isolate to the board level. | √ |

FIGURE 4B

500 TABLE OF EXEMPLARY COMMAND RESPONSES AND EXPLANATIONS

| Net Audit (Version X) | | |
|---|---|---|
| Command | RESPONSE | Net Advice |
| RTRV-CNFGRN:::001; | SOFTLINE2 00-07-18 09:01:38 M 001 COMPLD "SOFTLINE2"; | |
| RTRV-VER::CMP_W-01-01-15:002; | SOFTLINE2 00-07-18 09:01:38 M 001 COMPLD "SOFTLINE2"; "CMP"_W-01-01-15:1.1.2-A,1.0.0,1.0.0,1234578" | NETWORK ELEMENT NAME SOFTWARE VERSION |
| RTRV-IPADDR::CMP_W-01-01-15::003; | SOFTLINE2 00-07-18 09:43:44 M 003 COMPLD; "CMP"_W-01-01-15:165.122.231.52,255.255.255.0,165.122.231.90" | |
| RTRV-NETYPE:::004; | | |

510 EXAMPLE RESPONSE PARSING

Query: RTRV-NETYPE:::004;

Response: "CISCO,ONS15800,TERMINAL SITE,NE-V1.5"

FIELD: 1D  2D  3D  4D  5D

| Index Number | Field Name | OUTPUT |
|---|---|---|
| 1A | Network Element Name | PIR_MA_CNFGRN |
| 1D | Vendor Name | PIR_MA_NETYPE |
| 2D | Network Element Model Number | PIR_MA_NETYPE |
| 3D | Network Element Type | PIR_MA_NETYPE |
| 4D | Keyword SITE | PIR_MA_NETYPE |
| 5D | Network Element Version | PIR_MA_NETYPE |

Query: RTRV-EQPT:SOFTLINE2:ALL:004;

Response: "PRE_L  -01-01-01: IS-NR"
Response: "RBA    -01-01-02: IS-NR"
Response: "BBA    -01-01-01: IS-NR"
Response: "PRE_L  -01-01-01: IS-NR"
Response: "RBA    -01-01-01: IS-NR"
Response: "BBA    -01-01-01: IS-NR"
Response: "EOI_W  -01-01-01: IS-NR"
Response: "LSM_W -01-01-01: IS-NR"
Response: "CMP_W-01-01-01: IS-NR"
Response: "IOC_W  -01-01-01: IS-NR"
Response: ."SCF_W -01-01-01: IS-NR"
FIELD:       1E   2E 3E 4E

| Index Number | Field Name | OUTPUT |
|---|---|---|
| 1A | Network Element Name | PIR_MA_CNFGRN |
| 1E | Board Name | PIR_MA_EQPT |
| 2E | Rack Position | PIR_MA_EQPT |
| 3E | Sub-Rack Position | PIR_MA_EQPT |
| 4E | Slot Position | PIR_MA_EQPT |

FIGURE 5

600 Example DWDM Optical Network Audit Report OVERVIEW

| Section | Name | Description |
|---|---|---|
| 1 | Executive Summary | High level summary of network defined as Network Health |
| 2 | Net Audit Detail | Values, exceptions and Net Rule Exception Points (NREPs) Identified and broken down by node. |
| 3 | Net Audit Task List | General and network specific advice and information for resolving issues uncovered in the audit. |
| Appendix A | General Module Info | Details of NREPs, values and exceptions are dealt with in detail. |
| Appendix B | Device Unreachable Info | Lists the devices not included in this audit. |

610 Example DWDM Optical Network Audit NET AUDIT COLLECTION SUMMARY

| Name | Result |
|---|---|
| Collection Period | 7 Days |
| Collection Start Time | CollectionStart |
| Collection Stop Time | (date here) |
| ***Unreachable Nodes | Unreachable |

620 Example DWDM Optical Network Audit Net Audit NREP Summary

| Name | Result |
|---|---|
| Critical NREPs: | (Number of Critical NREPs) $Critical_NREP |
| Warning NREPs: | (Number of Warning NREPs) $WarningI_NREP |
| Total NREPs: | (Total number NREPs) $Total_NREP |
| Total Possible NREPs: | (Total Possible NREPs) $Possible_NREP |
| Net Audit Health | ((Total NREPs / Total Possible NREPs) x 100) $Net_Health |

Note: Ranking Formula: (Actual NREPs / Total NREPs) x Traffic Co-efficient

630 Audit Exception Detail Table

| Fault Management | | Performance Management | | Capacity Planning Management | | Configuration Management | |
|---|---|---|---|---|---|---|---|
| System | | System | | System | | System | |
| Media | | Media | | Media | | Media | |
| Protocol | | Protocol | | Protocol | | Protocol | |
| Total NREPs | | Total NREPs | | Total NREPs | | Total NREPs | |

FIGURE 6

700 CONFIGURATION MANAGEMENT Example

710 Network Element Table

| Network Element Name | TL1 Agent Software Version | IP Address | Uptime (Days) |
|---|---|---|---|
| | | | |
| | | | |
| | | | |

720 Board Table

| Network Element Name | Board Name | Board Position | | | Serial Number |
|---|---|---|---|---|---|
| | | R (rack) | SR (subrack) | S (slot) | |
| | | | | | |
| | | | | | |
| | | | | | |

FIGURE 7

800  MEDIA ANALYSIS Example

810  Pre-L Board Table (RESULT EXAMPLE)

| Network Element Name | Board Name | Board Position | | | | Laser 1 | | | Input Power | Output Power | |
|---|---|---|---|---|---|---|---|---|---|---|---|
| | | R | SR | S | | Temp | Current | Power | | Blue | Red |
| SOFTLINE2 | PRE_L | 1 | 1 | 4 | WP | 25.000 | NA | NA | NA | NA | NA |
| | | | | | CV | 25.000 | 146.330 | 80.430 | -15.710 | -5.017 | 10.884 |
| | | | | | TH1 | HIGH 28.000 | DEG | DEG 72.000 | DEG -23.497 | DEG 1.492 | DEG -12.07 |
| | | | | | TH2 | LOW 22.000 | FAIL 290.000 | FAIL 10.000 | FAIL -29.508 | FAIL -1.002 | FAIL -13.01 |
| | | | | | TH3 | NA | LOW 25.000 | NA | NA | NA | NA |

820  8WD-B AND 24WD_R (Demultiplexer) Board Table (RESULT EXAMPLE)

| Network Element Name | Board Name | Board Position | | | | Average Temperature |
|---|---|---|---|---|---|---|
| | | R | SR | S | | |
| EAST | 8WD_B | 1 | 1 | 7 | WP | 78.020 |
| | | | | | CV | 78.020 |
| | | | | | TH1 | HIGH 93.020 |
| | | | | | TH2 | HMID 81.020 |
| | | | | | TH3 | LMID 75.020 |
| | | | | | TH4 | LOW 63.030 |

830  RBA, BBA, TPA-R, TPA-B (Booster and Transmitter Amplifiers) Board Table (RESULTS EXAMPLE)

| Network Element Name | Board Name | Board Position | | | | Laser 1 | | | Laser 2 | | | Input Power | Output Power |
|---|---|---|---|---|---|---|---|---|---|---|---|---|---|
| | | R | SR | S | | Temp | Current | Power | Temp | Current | Power | | |
| EAST | TPA_R | 1 | 1 | 1 | WP | 25.000 | NA | 75.000 | 25.000 | NA | 50.000 | NA | NA |
| | | | | | CV | 25.010 | 137.660 | 80.430 | 25.010 | 91.990 | | -13.160 | 12.812 |
| | | | | | TH1 | HIGH 28.000 | DEG 157.000 | DEG 157.000 | HIGH 28.000 | DEG 157.000 | DEG | HIGH -51.003 | HIGH 12.761 |
| | | | | | TH2 | LOW 22.000 | FAIL 250.000 | FAIL 250.000 | LOW 22.000 | FAIL 250.000 | FAIL | DEG -28.013 | DEG 9.196 |
| | | | | | TH3 | NA | LOW 25.000 | LOW 25.000 | NA | LOW 25.000 | LOW | FAIL -30.507 | FAIL 6.990 |

FIGURE 8A

840 LEM, RXT and WCM (Channel Board) Table

| Network Element Name | Board Name | Board Position | | | CH. NUM. | | Laser 1 | | | | Laser 2 | | | | Input Power | | Output Power | |
|---|---|---|---|---|---|---|---|---|---|---|---|---|---|---|---|---|---|---|
| | | R | SR | S | | | Temp | Current | Power | | Temp | Current | Power | | Inst. 1 | Inst. 2 | Inst. 1 | Inst. 2 |
| EAST | WCM | 1 | 3 | 5 | 5 | WP | 25.400 | NA | NA | | | | | | NA | | NA | |
| | | | | | | CV | 25.650 | 61.460 | 9.951 | | | | | | -3.131 | | 0.083 | |
| | | | | | | TH1 | HIGH 27.390 | DEG 72.650 | HIGH 12.000 | | | | | | HIGH | | HIGH 1.004 | |
| | | | | | | TH2 | LOW 23.400 | FAIL 84.750 | LOW 8.000 | | | | | | LOW -19.208 | | LOW -1.029 | |

850 ADA (ADD/DROP AMPLIFIER) BOARD TABLE

| Network Element Name | Board Name | Board Position | | | | Laser 1 | | | | Laser 2 | | | | Input Power | | Output Power | |
|---|---|---|---|---|---|---|---|---|---|---|---|---|---|---|---|---|---|
| | | R | SR | S | | Temp | Current | Power | | Temp | Current | Power | | Inst. 1 | Inst. 2 | Inst. 1 | Inst. 2 |
| OADMSITE | ADA | 1 | 1 | 6 | WP | | | | | | | | | | | | |
| | | | | | CV | | | | | | | | | | | | |
| | | | | | TH1 | HIGH | LOW | DEG | | HIGH | LOW | DEG | | DEG | DEG | DEG | DEG |
| | | | | | TH2 | LOW | DEG | FAIL | | LOW | DEG | FAIL | | FAIL | FAIL | FAIL | FAIL |
| | | | | | TH3 | NA | FAIL | NA | | NA | FAIL | NA | | NA | NA | NA | NA |

860 OADM (Optical Add/Drop Multiplexer)

| Network Element Name | Board Name | Board Position | | | Laser Temperature 1 | Laser Temperature 2 |
|---|---|---|---|---|---|---|
| | | R | SR | S | | |
| OADMSITE | OADM-P4-B1 | 1 | 1 | 6 | | |
| | | | | | WP | |
| | | | | | CV | |
| | | | | | TH1 | HIGH | HIGH |
| | | | | | TH2 | LOW | LOW |
| | | | | | TH3 | | |

FIGURE 8B

870 SCF Board Table

| Network Element Name | Board Name | Board Position | | | Fan Current | | | | DC Converter | Battery Control |
|---|---|---|---|---|---|---|---|---|---|---|
| | | R | SR | S | Inst. 1 | Inst. 2 | Inst. 3 | Inst. 4 | | |
| | | | | WP | | | | | | |
| | | | | CV | | | | | | |
| | | | | TH1 | | | | | | |
| | | | | TH2 | | | | | | |
| | | | | TH3 | | | | | | |

880 IOC Board Table

| Network Element Name | Board Name | Board Position | | | Analogic Input/Output | | | | | | | |
|---|---|---|---|---|---|---|---|---|---|---|---|---|
| | | R | SR | S | 1 | 2 | 3 | 4 | 5 | 6 | 7 | 8 |
| | | | | WP | | | | | | | | |
| | | | | CV | | | | | | | | |
| | | | | TH1 | | | | | | | | |
| | | | | TH2 | | | | | | | | |
| | | | | TH3 | | | | | | | | |

890 LSM Board Table

| Network Element Name | Board Name | Board Position | | | Laser East | | Laser West | | Output Power | |
|---|---|---|---|---|---|---|---|---|---|---|
| | | R | SR | S | Temp | Current | Temp | Current | Inst. 1 | Inst. 2 |
| | | | | WP | | | | | | |
| | | | | CV | | | | | | |
| | | | | TH1 | | | | | | |
| | | | | TH2 | | | | | | |
| | | | | TH3 | | | | | | |

FIGURE 8C

900  PERFORMANCE ANALYSIS EXAMPLE

910  B1 Monitoring Board Table

| Network Element Name | Board Name | Board Position | | | Ch. Num. | Current | | | | 15 Minute | | | | 24 Hour | | | |
|---|---|---|---|---|---|---|---|---|---|---|---|---|---|---|---|---|---|
| | | R | SR | S | | ES | SES | BBE | UT | ES | SES | BBE | UT | ES | SES | BBE | UT |
| | | | | | | | | | | | | | | | | | |
| | | | | | | | | | | | | | | | | | |

920  Alarm Status Table

| Network Element Name | Board Name | Board Position | | | Alarm Status | NREPs |
|---|---|---|---|---|---|---|
| | | R | SR | S | | |
| | | | | | | |
| | | | | | | |

1000  Capacity Planning Example

1010  Board Software Table

| Board Name | Software Version | Network Element Name | Board Position | | |
|---|---|---|---|---|---|
| | | | R | SR | S |
| | | | | | |
| | | | | | |

FIGURE 8D

CARRIER CLASS DWDM OPTICAL NETWORK AUDIT TOOL

FIELD OF THE INVENTION

The present invention relates to a method for providing a network audit of Carrier Class DWDM optical networks.

BACKGROUND OF THE INVENTION

Networking, and Internetworking, provide electronic devices the ability to communicate with remote devices, along with the other associated benefits of such communication. However, networks can consist of large numbers of devices spread over enormous geographic areas. Consequently, maintaining the health of such networks present considerable challenges. A network may consist of a variety of types of devices, communicating over a variety of mediums, using various protocols. Such networks may include wireless devices, traditional voice, ATM, Frame Relay, Cable, DSL, and dial platforms. Optical networks are becoming increasingly popular for performance reasons.

With the ever increasing demand for bandwidth and the need to deploy new network services, networks of more and more enormous capacity are now necessary to provide the base infrastructure to support high traffic requirements. Optical-fiber based networks, having rapidly become the standard network media, provide much larger bandwidth than previous technologies and fill these needs. There are currently over 3 million miles of optical fiber in place and much more planned.

Technologies have developed that increase the available usage of even the intrinsic high density usage provided by fiber-optics. One of these many technologies is Dense Wavelength Division Multiplexing (DWDM).

The vastly increasing density of usage, and users, makes the management of large networks ever more complex. The tools to assist net management have advanced along with the progress in net tools. A significant part of a net management tool kit is the ability to audit the performance of the network infrastructure. However, each new development in networking increases the demands on net auditing capability.

Three faces of network management drive the basics of network auditing. Configuration management needs cover the hardware connections. Performance management is necessary to guarantee a quality of service to the network users. Fault management provides protection techniques to ensure the network continues to function in the presence of failures. Network elements such as optical amplifiers, add/drop multiplexers, cross-connects and other optical network elements, require proactive auditing to meet the levels of service expected by providers and end users.

What is required, then, is a means of providing a proactive audit in a Dense Wavelength Division Multiplexing (DWDM) optical network. Specifically, the auditing tool that meets this need must efficiently collect data from a multitude of devices and device types that are diverse in performance and in geography. Furthermore, the tool must present the results of the data collection in a manner that allows timely and appropriate responses, consisting of corrective actions or effective planning, by users.

SUMMARY OF THE INVENTION

The present invention relates to a method for providing an audit of a network. Specifically, the present invention provides a method of auditing a Carrier Class DWDM (Dense Wave Division Multiplexing) optical network. More specifically, embodiments of the present invention provide an efficient and proactive audit of DWDM optical network that includes an enormous array of geographically diverse, and performance-diverse, devices. Embodiments of the present invention efficiently collect data from a multitude of devices and device types and present the results of the data collection in a manner that allows timely and appropriate responses, including corrective actions and effective planning, by providers and end users.

An automated audit tool is disclosed for auditing a Carrier-Class DWDM optical network, including its infrastructure devices. The automated audit tool performs a process that includes the steps of transmitting an initial query code to hardware devices in the DWDM optical network in order to determine the network configuration, receiving responses to the first query code that enable the determination of configuration, transmitting a second query code to the hardware devices that is based on the information in the first response, receiving the responses to the second query code and producing a report of the responses and the analysis.

Embodiments of the present invention are disclosed that include a method for auditing a carrier class DWDM optical network. The method comprises the steps of transmitting a first query to a hardware device, receiving a response to the first query, transmitting a second query to the hardware device, basing the content in the second query code on the response to the first query and producing a report of all the responses and the analysis of those responses.

BRIEF DESCRIPTION OF THE DRAWINGS

The operation of this invention can be best visualized by reference to the drawings.

FIG. 4A is a table of exemplary commands generated by one embodiment of the present invention.

FIG. 4B is a continued table of exemplary commands generated by one embodiment of the present invention.

FIG. 5 is a table of exemplary command responses received, parsed and analyzed in one embodiment of the present invention.

FIG. 6 is an illustration of an exemplary implementation of a network audit report, in tabular format in accordance with one embodiment of the present invention.

FIG. 7 is an illustration of analysis results tables, in accordance with an embodiment of the present invention.

FIG. 8A is an illustration of Media analysis results tables, including exemplary values, in accordance with an embodiment of the present invention.

FIG. 8B is a continuation of an illustration of Media analysis results tables, in accordance with an embodiment of the present invention.

FIG. 8C is a further continuation of an illustration of Media analysis results tables, in accordance with an embodiment of the present invention.

FIG. 8D is yet a further continuation of an illustration of Media analysis results tables, in accordance with an embodiment of the present invention.

SPECIFICATION

Figure 1:
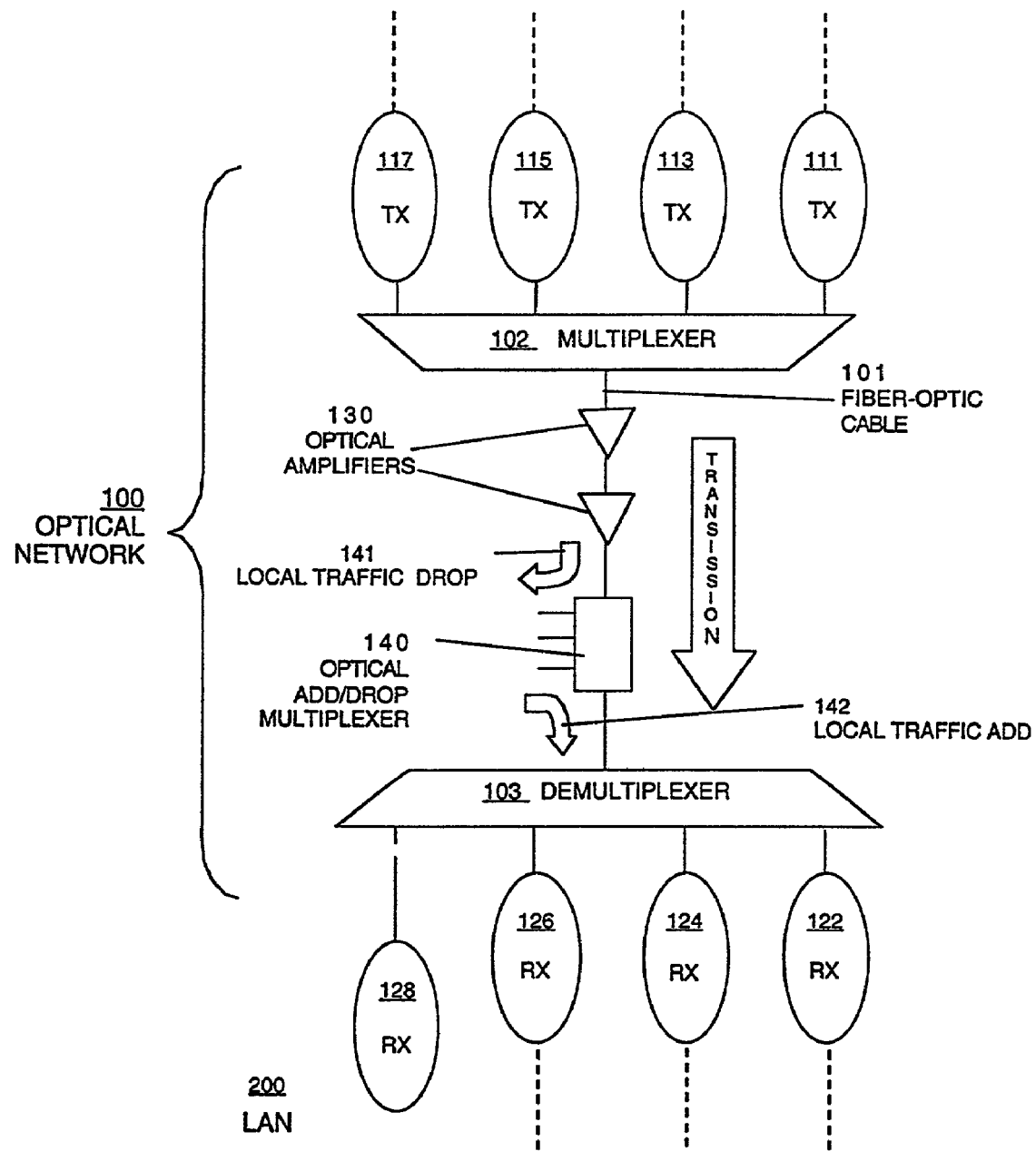
FIG. 1 illustrates a block diagram of an exemplary DWDM optical network, in which embodiments of the present invention operate.

Reference will now be made in detail to the preferred embodiments of the invention, an automated DWDM optical network audit tool, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes (e.g., process 800 of FIG. 8) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

DETAILED DESCRIPTION

The area in which Embodiments of the present invention may be practiced is that of optical networks. Specifically, they are envisioned to be practiced in Dense Wavelength Division Multiplexing (DWDM) optical networks.

DWDM networking differs from conventional optical networking in the methods by which signals are multiplexed onto a single fiber strand. Tremendous amounts of information can be modulated onto the wavelengths of the laser light used to carry data. Using equipment that generates laser light of very precise wavelengths and very high discretion filters, a large number of different wavelengths can be carried simultaneously on an optical fiber. DWDM technology has evolved to the point that parallel wavelengths can be densely packed and integrated into a transmission system, with multiple, simultaneous, extremely high frequency signals in the 192 to 200 terahertz (THz) range which corresponds to wavelengths in the 1550 nm region. Wavelength spacings are usually 100 GHz or 200 GHz, corresponding to 0.8 nm or 1.6 nm.

The precision equipment required to accomplish the generation, propagation, routing and separation of densely packed light waves is necessarily sensitive. These sensitive items of precision equipment, possibly working together from opposite sides of the planet, require careful and constant monitoring.

A critical, yet often under-appreciated, part of any telecommunications network is the management system whose reliability is especially vital in the complex and high capacity world of DWDM. Indeed, dependable and easily accessible network management services are increasingly becoming a distinguishing characteristic of high-performance, high-capacity, systems. Today's leading DWDM systems require integrated network management programs that are designed to work in conjunction with other operations support systems (OSSs) and are compliant with the standards the International Telecommunication Union (ITU) has established for Telecommunications Management Network (TMN).

Embodiments of the current invention can utilize the working channels of the DWDM product to create a standards-based data communications network that allows service providers and end users to remotely monitor and control system performance and use. A network audit tool can communicate with each node in the system and also provide dual homing access and self-healing routing information in the event of a network disruption. By meeting applicable standards and utilizing the appropriate interfaces, the embodiment of the present invention discussed here ensures that end users retain high operations, administration, maintenance, and provisioning (planning) service.

The embodiment of the present invention discussed herein is an automated network audit system and method that facilitates efficient and effective network resource management and maintenance. An automated network communication device audit tool communicates with the infrastructure of a network; the transmitters, amplifiers, multiplexers, demultiplexers, receivers and a host of others. It is noted here that the terms "automated network communications device audit system and method", "automated network audit system and method" and "audit tool" are used interchangeably in this discussion with no distinction.

The audit tool analyzes the condition and performance of the infrastructure devices, and reports the results in a convenient format. This embodiment of the present invention utilizes a "backend" intelligence to discover and analyze problems with devices included in the network and provides recommendations for potential solutions or corrective courses of action. In one implementation of the present invention, a communication network device audit report provides information in a plain, descriptive, manner that facilitates easy understanding of the capabilities and status of communication devices and problems the network devices are exhibiting. By way of example, a network communication device audit report, exemplary of one likely to be presented by this embodiment of the present invention, is presented in the accompanying figures. Such an audit report provides for facilitated management and maintenance of the network.

In this embodiment of the present invention, an automated audit tool utilizes a unique methodology to analyze the "health" of a network. The net audit methodology determines the characteristics of devices, such as an optical transmitter, for example, within a network, compares the results to a set of established net rules, and identifies net rule exception points (NREPS). In this embodiment, the net rules comprise definitions of predefined thresholds for acceptable tolerances associated with different characteristics of the network, for example different acceptable tolerances for components included in an optical transmitter. In one embodiment of the present invention, the net rules provide a standard by which the readiness and stability of a node, anywhere devices are located, is measured. In this embodiment, the points are used to identify present as well as potential problems and to rate each impacted node by the most critical to the least critical problem.

Net Rules and Net Rules Exceptions provide an objective method to gauge the readiness and stability of a node or overall network health by using pre-determined thresholds. Two thresholds can be defined. First, a 'warning', which may be indicative of possible problematic areas and should be investigated. Warnings can appear within audit result data tables, highlighted yellow with bolded font, in one embodiment. Warnings are assigned one point. A second threshold is 'critical', which may be defined as a condition that requires immediate action. Critical thresholds can be displayed as bolded red font. Critical thresholds are assigned 1000 points. Using these two thresholds, a Net Audit Health Percent can be defined in accordance with Equation 1:

Net Audit Health %=100−((Total NREPs/Total Possible NREPs)×100)　　　Eq. 1

Note that there may be other equations which are as applicable to a network health assessment. Equation 1 is, though, a means of such assessment in the embodiment of the present invention discussed herein.

In the embodiment of the present invention discussed here, network communication device responses and problems are assigned to a category and NREPs are assigned according to each category. In one exemplary implementation, results obtained from communication devices are divided into either an acceptable category, a warning category or a critical category. Each category has determined associated parameter thresholds.

In the example of the DWDM transmitter, of which a very precise IR laser is a significant part, the results include wavelength generation information associated with the device. A wavelength performance within an Acceptable predetermined range (e.g., 1549.9 nm to 1550.1 nm for a nominal 1550 nm laser diode) could be associated with the acceptable category, a Questionable predetermined range (e.g., 1549.7 nm to 1550.3 nm) is associated with a warning category and an Unacceptable range (e.g., anything outside of 1549.7 nm to 1550.3 nm). Note that these numbers are strictly for the sake of illustration and have no relation to any actual device parameters. Any device designated as part of a critical category could have high priority flags associated with questionable or unacceptable performance.

In order to more readily understand the concepts presented in this embodiment of the present invention, reference will now be made to the figures and to process steps illustrated in Flowchart 900 in FIG. 9. FIG. 1 is a block diagram representation of an exemplary DWDM optical network. In keeping with the particular utility of DWDM in MAN, WAN and Internet applications, optical network 100 is illustrated as inter-linking two groups of non-optical LANs. Four LANs are shown transmitting data through optical transmitters 111-117 and four other LANs, including LAN 200, are shown receiving data via receivers 122-128. It is appreciated that the simplicity shown in FIG. 1 is only for the sake of clarity in the explanation of concepts presented in this embodiment of the present invention. An actual DWDM optical network, in which this embodiment of the present invention could operate, may be immensely more complex than the illustration with multiple pathways in operation and hundreds, if not thousands, of nodes.

In one embodiment of the present invention, the actual audit process could be run from a server in one of the LANs connected to the lining network or from a device co-located with a dedicated device in the network infrastructure. Another embodiment of the present invention could be implemented from a provider's site located remotely and connected only peripherally to the network.

The infrastructure devices illustrated in FIG. 1 include optical transmitters 111-117, optical multiplexer (Mux) 102, optical amplifiers 130, optical add/drop multiplexer (OADM) 140, demultiplexer (DeMux) 103, optical receivers 122-128 and optical fiber cable 101. OADM 140 is shown adding and dropping local traffic. OADMs perform their add/drop functions on applicable wavelength signals with no effect on the other signals carried in the cable. Proper and reliable performance of OADMs is crucial to the uninterrupted throughput of the remaining signals and monitoring OADM performance is one of the many important functions of this embodiment of the present invention.

Figure 2:
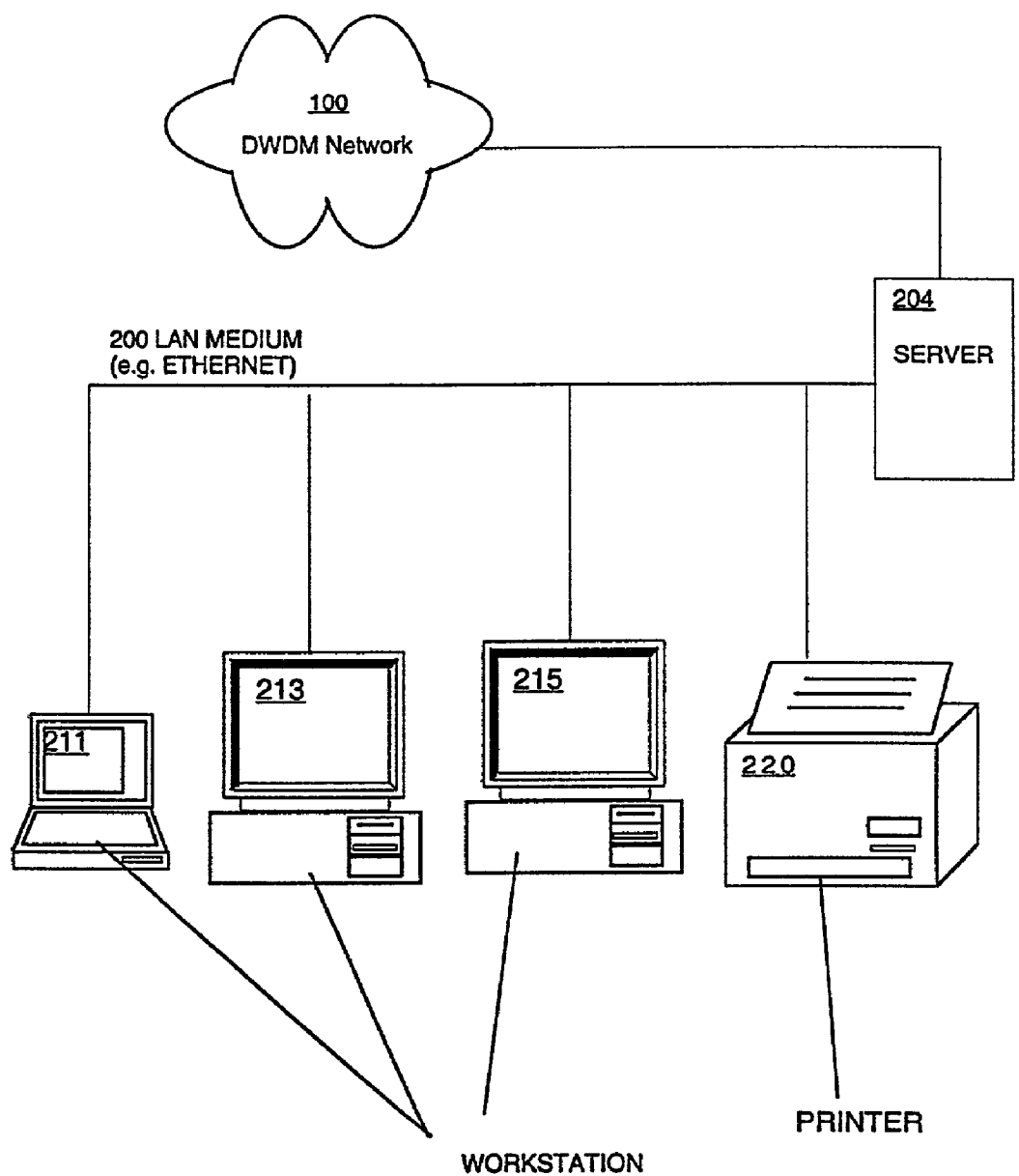
FIG. 2 illustrates a typical Local Area Network (LAN), in accordance with an embodiment of the present invention.

FIG. 2 is a block diagram of a typical local area network (LAN) 200. In one embodiment of the present invention, an automated network device audit could be implemented from and in LAN 200. LAN 200 includes server 204 and workstations 211-215 as well as, in this case, printer 220. A typical LAN may include many other devices, but the concepts presented here can be explained without a more elaborate illustration.

One embodiment of the present invention may include a dedicated audit device mounted in server 204, which is also a likely location for optical transmitters and receivers. These devices may also be located in a dedicated communications rack or other location without altering their need for audit as implemented by this embodiment. Server 204 is shown in FIG. 2 as the connection point to DWDM optical network 100, which is in keeping with locating the optical network devices in server 204.

Figure 3:
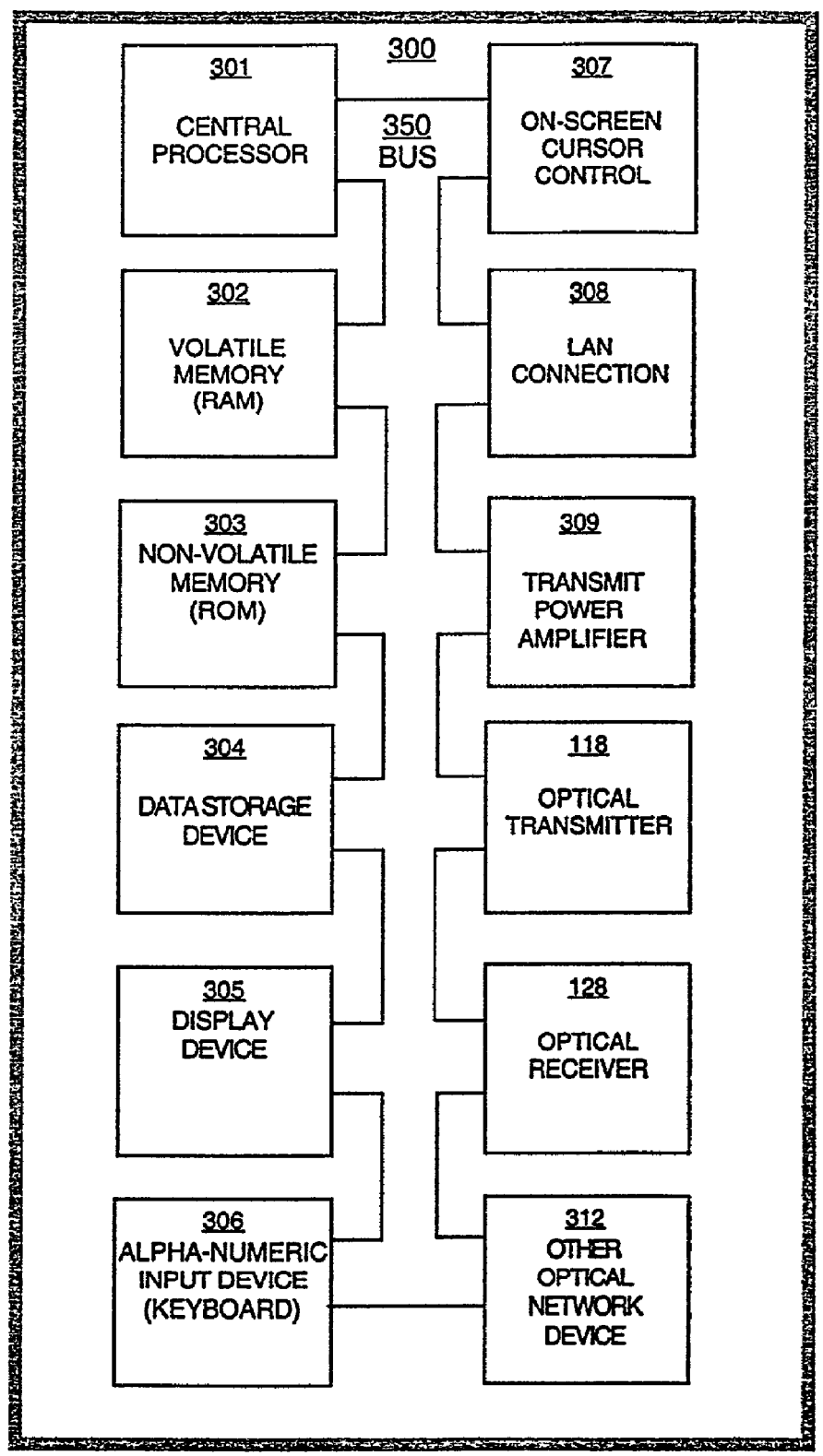
FIG. 3 illustrates, in block diagram, a typical computer system, in accordance with an embodiment of the present invention.

FIG. 3 illustrates a block diagram of a computer system in use as a LAN server similar to server 204. A typical server may contain many devices for the operation of its LAN as well as devices for communication to outside links and networks, such as DWDM optical network 100. Computer system 300 includes bus 350, central processor 301, a random access memory 302, a read only memory 303, data storage device 304, display device 305, alphanumeric input device 306, cursor control device 307 and LAN connection 308. Bus 350 is coupled to each device.

Also included in computer system 300 are devices specific to the optical network. In addition to optical transmitter 118 and optical receiver 128 are transmit power amplifier 309 and any other applicable, optical network device, shown at 312.

The embodiment of the present invention discussed here can be implemented by the components of computer system 300. Central processor 301 processes information and instructions including instructions associated with the automated network audit implemented by this embodiment of the present invention. Random access memory 302 stores information and instructions for central processor 301. Read only memory 303 stores static information and instructions for processor 301. Data storage device 304, which may be a magnetic or optical disk and disk drive, stores information and instructions. Display device 305 displays information to a computer user. Alphanumeric input device 306 includes alphanumeric and function keys for communicating information and command selections to central processor 301. Cursor control device 307 communicates user input information and command selections to central processor 301. Bus 350 is a path for communicating information. When this embodiment of the present invention is implemented, the results of the network audit can be printed out at network printer 220, displayed on display device 305, or presented by some other means.

FIGS. 4A and 4B illustrate, in tabular form, exemplary commands executed (as in step 910 of the flowchart in FIG. 9) by this embodiment of the present invention. The tables include an explanation of the functions of the commands and their effects within the audited network. It is noted in the tables that each command is associated with a polling frequency, which, in this embodiment of the present invention, is a settable variable that configures each executed query to the needs of the client network and the client network owner.

In many of the figures presented, reference is made to some of the many devices employed in various parts of DWDM optical networks. Some of the devices employ the terms "Red Band", "Blue Band" and "Infrared Band". These terms refer, not to actual light colors, but to portions of the light spectrum most commonly used in DWDM applications: "Blue Band" refers to the spectrum portion with the shortest wavelengths, "Infrared Band" refers to the portion with the longest wavelengths and "Red Band" refers to a portion in between. Each of these designations is actually used in reference to a portion of the infrared spectrum, in the vicinity of 1550 nm wavelength, that is quite prevalent in DWDM network applications.

The embodiment of the present invention discussed herein performs audits of devices in a DWDM optical network. The following discussion focuses on the family of devices some of the more common devices used in such a network. There is a number of devices, employed in the implementation of DWDM networks, that are specific to that optical environment. While the generic functions performed may be found in other types of networks, the devices are generally specific to DWDM.

An Add Drop Amplifier (ADA) provides a means of extracting or inserting an additional channel in a fiber cable. It provides amplification for the inserted channel and is located at any point suitable for an add/drop site.

An Optical Add Drop Multiplexer (OADM) can insert multiple signals in a fiber cable as well as extract specific signals. Like the ADA, it provides amplification for the inserted channels and is also located at any point suitable for an add/drop site.

A Wavelength Converter Module (WCM) is used to convert optical signals into the specific wavelength required by a multiplexer. Signals can then occupy an empty channel in a fiber cable.

Multiplexers combine multiple signals onto a single optical fiber in the form of different wavelength channels. Demultiplexers, inversely, separate different wavelengths that are multiplexed on a single channel. Two specific demultiplexer types referred to in this embodiment of the present invention are the 24WD_R and the 8WD_B which are twenty-four channel in the "red" band and eight channel in the "blue" band, respectively, demultiplexers.

In one embodiment of the present invention audit reports are organized by type of network device. FIG. 6 illustrates, in block diagram, the sections of audit report 600, which is resultant from the operation of one embodiment of the present invention. Audit report 600 includes an overview section, net audit collection summary section 610, net audit NREP summary section 620, and audit exception detail section 640 as well as written analyses of each of these resultant information tables. Included in the analyses is an executive summary section that provides an overview of the "health" of a network and the results of the audit. The tables illustrated in FIG. 6 provide detailed information in a convenient, user friendly, format.

A Net audit task list is included in the summary to provide a hierarchical presentation of network device problems and potential problems in order of adverse impact on the reliability of the network. An appendix section is also included to provide additional helpful information for interpreting the audit report.

This embodiment of the present invention, an automated DWDM network audit tool (system and method) automates the arduous process of determining configuration of a network, formulating query commands based on that configuration, gathering, parsing, analyzing, and organizing the information responsive to the queries and recommending action when necessary in response to the analysis of the responsive information. A present invention automated DWDM network audit tool automatically creates the net audit detail section reports.

In one embodiment of the present invention, building an audit report table begins with gathering network configuration information. The present embodiment gathers the network configuration information by formulating commands compliant with precise syntax requirements. FIGS. 4A and 4B illustrate some of the exemplary commands and FIG. 5 illustrates some of the responsive retrieved network element information. This embodiment of the present invention includes guidelines for interpreting the retrieved information.

The present invention automated system is capable of automatically formulating a large number of commands in correct syntax for a variety of network elements. FIGS. 4A and 4B are a tabular compilation of some of the commands utilized to obtain information from devices in a DWDM network.

Figure 9:
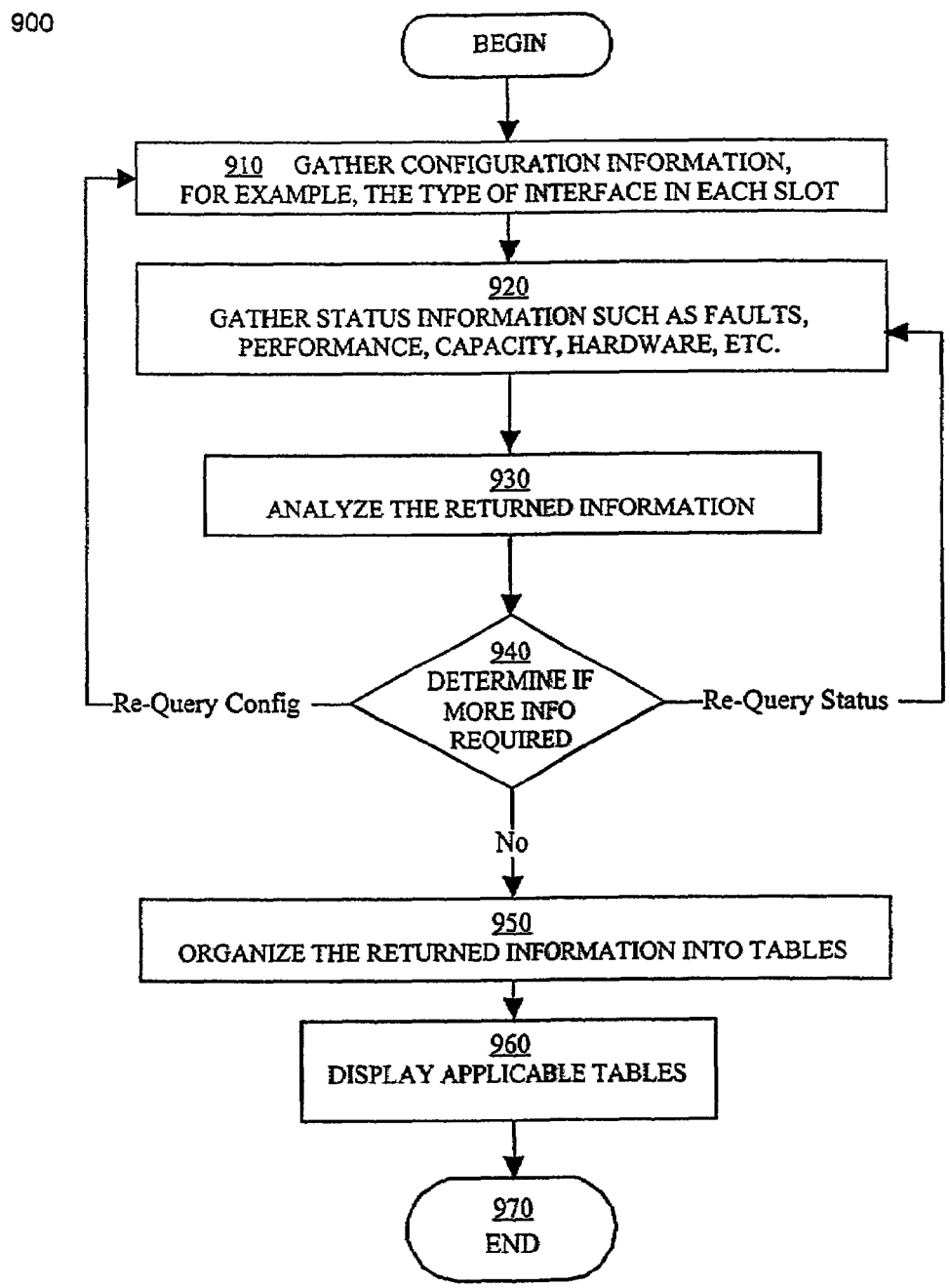
FIG. 9 is a flowchart illustrating the steps of a process of performing a network audit, in accordance with an embodiment of the present invention.

Reference is now made particularly to the steps in process 900 of FIG. 9. In process 900, the functionality and performance of communication devices included in a network are analyzed. In one embodiment of the present invention, an automated intelligent expert network audit analysis process is utilized to analyze the performance of communication devices included in a network.

In step 910, network device configuration information is gathered. In one embodiment of the present invention, automated DWDM network audit tool 900 gathers configuration information by forwarding a command that queries the configuration of a network device (e.g., a DWDM device). In one exemplary implementation of the present invention, the syntax for the configuration command query is the first command shown in FIG. 4A. In one exemplary implementation of the present invention, automated DWDM network audit tool 900 queries also queries the type of board in a slot, such as a pre-l board, a demultiplexer board (e.g., 8WD_B or 24WD_R), booster amplifier board, transmitter amplifier board, channel board, monitoring board, add/drop amplifier (ADA) board, Optical add-drop amplifier board (OADM), (------------) (SCF) board, (------------) (IOC) board, and a (------------) (LSDM) board.

In step 920 status information is gathered. In one embodiment of the present invention, automated DWDM network audit tool 900 gathers status information by forwarding a command that queries the configuration of a network device (e.g., a DWDM device). Exemplary commands to query status are shown in FIGS. 4A and 4B (e.g., the last command shown in FIG. 4B). In one embodiment of the present invention, status information associated with faults and performance is gathered. In one exemplary implementation of the present invention, automated DWDM network audit tool 900 issues a retrieve threshold command (e.g., RTRV-TH::8WD_B-01-01-07::002) that queries temperature values.

In step 930 the returned information for each node is analyzed for warning and critical conditions. In one embodiment of the present invention is parsed and information associated with analysis of the device configuration and performance is presented in convenient and user-friendly formats. In one embodiment, automated network audit tool 900 automatically performs a parsing process that identifies portions of information retrieved in step 920 and correlates it to a function. In one embodiment, a present invention analysis process utilizes an intelligent backend to analyze the parsed information. In one exemplary implementation of the present invention, the parsed information is compared to values included in an expert network audit database. The values in the expert network audit database include thresholds parameters that indicate acceptable performance and functionality.

This embodiment of the present invention receives the information in response to the command (e.g., the retrieve (RTRV:) command) and assigns index identifiers to categories of returned information (e.g., see FIG. 5). This embodiment of the present invention utilizes the automated network communication device audit tool intelligent expert system backend to determine appropriate boundaries for index boarders in each line of retrieved information. The present invention correlates the index identifications to the titles of field columns in a net audit detail section. FIG. 5 shows a representation of index correlation information stored and utilized by one exemplary implementation of a present invention automated network communication device audit smart expert system. The index correlation information is utilized to make correlations between information received from a network element and presentation of the information in a network audit detail table.

After the information is parsed the automated DWDM network audit tool 900 analyzes the information for warning and critical conditions. In an exemplary audit of a DWDM with a precise IR laser, the returned information includes wavelength generation information associated with the device. The automated DWDM network audit tool 900 intelligent backend system compares the returned information to a set of predetermined ranges and assigns an acceptable, warning of critical identification to the returned values. For example, an acceptable value could be a wavelength of 1549.9 nm to 1550.1 nm, a warning value in the range of 1549.7 nm to 1549.9 nm or 1550.1 nm to 1550.3 nm, and a critical range of wavelengths outside 1549.7 nm to 1550.3 nm.

In step 940 a decision is made if additional queries are required. If additional configuration information is required the process returns to step 910. If additional status information is required the process returns to step 920. For example, if after analyzing the returned information in step 930 additional temperature information associated with particular working points is required to fill in a particular desired report (e.g., a report specified by a network manager), a decision is made to return the process to step 920 where an additional query command is issued (e.g., a RTRV-WRKP:: 8WD_b-01-01-01-07::002 command is issued that retrieves working point temperature information for an 8WD board). Automated DWDM network audit tool 900 proceeds to step 950 if no additional information is required.

In step 950 the returned information is organized into tables. In one exemplary implementation of the present invention, information is organized in a summary table (see FIG. 6) and component tables (see FIG. 7). The present invention utilizes correlations between the cells of the tables and the parsing boundaries (see FIG. 5) to determine the appropriate location in a table for specific returned information.

In step 960 the applicable tables are displayed. In one embodiment of the present invention the applicable tables are displayed on a computer monitor (e.g., display device 305) and in a printed report. Exemplary Tables of information associated with some of the many applicable devices is shown in FIGS. 8A, 8B, 8C and 8D. Included in the example response tables are DWDM demultiplexers, both an 8WD-B and a 24WD-R in this example, a PRE_L board, RBA, BBA, TPA-R and TPA-B amplifiers, channel boards, and optical and non-optical add/drop amplifiers. This embodiment of the present invention parses the information and presents it in convenient tabular form. This embodiment applies a set of network rules to the retrieved information and provides indications of problems with the network elements. Displaying the information tables is illustrated in step 960, shown in flowchart 900 in FIG. 9. In one embodiment of the present invention the applicable tables are displayed on a computer monitor (e.g., display device 305) and in a printed report.

Warning indications could appear within data tables in a contrasting fashion. By way of example, a result could be presented in a special font (e.g., bold font) and in a contrasting color (e.g., yellow). The warnings are indicative of possible or potential problematic areas that should be considered for further investigation or corrective action. In one embodiment of the present invention, the warning categories have a net rule exception point value of 1 which is assigned a device parameter (e.g., an optical transmitter laser power value) that is within the warning threshold ranges for the device parameter. Critical threshold exceptions are displayed in a highlighted fashion. For example, emboldened red text. Critical thresholds could be used to indicate a condition that requires prompt attention and corrective action.

Embodiments of the present invention collect data regarding network performance, defects, errors, configuration, etc., and automatically analyze the data. Then, the data is organized in a user-friendly fashion and displayed as a number of tables. By organizing the network information, an end-user is able to obtain an understanding of the general health of the DWDM optical network. This information may be used to make recommendations for the network on issues such as software version updates, hardware platform upgrades and configuration/topology changes. Embodiments are able to identify configuration mismatches in the network and make recommendations of standard processes that can be implemented to manage the resource. Additionally, the audit may identify areas in which overall network availability can be maximized. Embodiments display information related to four categories: Configuration, Faults, Capacity, and Performance.

The preferred embodiment of the present invention, a tool for performing a DWDM network audit, is thus described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
transmitting a device configuration query to a hardware device in an optical network;
receiving a response to the device configuration query identifying at least one network device type associated with the hardware device;
transmitting at least one status query to the hardware device responsive to the response to the device configuration query, the status query formatted according to at least one of the network device types associated with the hardware device identified in the response to the device configuration query;
receiving a response to the status query that includes status information associated with the hardware device;
determining a health condition identifier associated with the hardware device responsive to the status information, the health condition identifier is configured to indicate a health performance-level associated with the hardware device; and
generating an audit report that includes an identification of the network device configuration associated with hardware device received in the response to the device configuration query, and the health condition identifier associated with the hardware device.

2. The method of claim 1, wherein the audit report includes recommendations associated with the management of the optical network.

3. The method of claim 1, wherein the health condition identifier having an acceptable category, an unacceptable category, or a questionable category, each to indicate a different performance-level associated with the hardware device.

4. The method of claim 3, wherein the health condition identifier is configured to indicate a correlation between identified exceptions to net rules and a total possible exceptions to the net rules, where the net rules include one or more of predefined thresholds of acceptable tolerances for characteristics associated with the hardware device.

5. The method of claim 1, wherein said hardware device is a portion of said network's infrastructure.

6. The method of claim 1, includes transmitting at least the device configuration query or the status query through at least a portion of the optical network.

7. The method of claim 1, wherein said transmitted queries are generated by a dedicated network audit device.

8. The method of claim 1, includes receiving the responses from the hardware device through at least a portion of the optical network.

9. The method of claim 1, wherein said device configuration query requests information related to the part number and location in said optical network of said hardware device.

10. The method of claim 1, wherein said status query is determined by database reference to the network device type of said hardware device.

11. The method of claim 1, wherein a further step of analyzing said responses to said queries is performed by automated intelligent decision-making.

12. A device for auditing an optical network, comprising:
a transmitting element;
a receiving element coupled to said transmitting element; and,
a computing element, coupled to said receiving element, and configured to
transmit a device configuration query to a hardware device in an optical network through the transmitting element;
receive a response to the device configuration query identifying at least one network device type associated with the hardware device through the receiving element;
transmit at least one status query to the hardware device through the transmitting element responsive to the response to the device configuration query, the status query formatted according to at least one of the network device types associated with the hardware device identified in the response to the device configuration query;
receive, through the receiving element, a response to the status query that includes status information associated with the hardware device;
determine a health condition identifier associated with the hardware device responsive to the status information, the health condition identifier is configured to indicate a health performance-level associated with the hardware device; and
generate an audit report that includes an identification of the network device configuration associated with hardware device received in the response to the device configuration query, and the health condition identifier associated with the hardware device.

13. A device as described in claim 12 wherein said device is further capable of automatically analyzing said responses to said queries.

14. A device as described in claim 13 wherein said device further capable of presenting the results of said automatic analyzing in a user-readable format.

15. A device as described in claim 12 wherein said device is further capable of making recommendations for appropriate action in the management of said optical network.

16. A device as described in claim 12 wherein at least a portion of said optical network is implemented as a DWDM optical network.

17. A computer useable medium having computer useable code embodied therein causing a computer to perform operations comprising:
transmitting a device configuration query to a hardware device in an optical network;
receiving a response to the device configuration query identifying at least one network device type associated with the hardware device;

transmitting at least one status query to the hardware device responsive to the response to the device configuration query, the status query formatted according to at least one of the network device types associated with the hardware device identified in the response to the device configuration query, receiving a response to the status query that includes status information associated with the hardware device;

determining a health condition identifier associated with the hardware device responsive to the status information, the health condition identifier is configured to indicate a health performance-level associated with the hardware device; and generating an audit report that includes an identification of the network device configuration associated with hardware device received in the response to the device configuration query, and the health condition identifier associated with the hardware device.

18. The computer useable medium in claim 17, wherein the audit report includes recommendations associated with the management of the optical network.

19. The computer useable medium described in claim 18, wherein a further step of analyzing said responses to said queries is performed by automated intelligent decision-making.

20. The computer useable medium described in claim 17, wherein the health condition identifier having an acceptable category, an unacceptable category, or a questionable category, each to indicate a different performance-level associated with the hardware device.

21. The computer useable medium described in claim 17, wherein said hardware device is a portion of said optical network's infrastructure.

22. The computer useable medium described in claim 17, wherein the health condition identifier is configured to indicate a correlation between identified exceptions to net rules and a total possible exceptions to the net rules, where the net rules include one or more of predefined thresholds of acceptable tolerances for characteristics associated with the hardware device.

23. The computer useable medium described in claim 17, includes transmitting at least the device configuration query or the status query through at least a portion of the optical network.

24. The computer useable medium described in claim 17, wherein transmitted queries are generated by a dedicated network audit device.

25. The computer useable medium described in claim 17, includes receiving the responses from the hardware device through at least a portion of the optical network.

26. The computer useable medium described in claim 17, wherein said device configuration query requests information related to the part number and location in said optical network of said hardware device.

27. The computer useable medium described in claim 18, wherein said status query is determined by database reference to the network device type of said hardware device.

28. A system comprising:
means for transmitting a device configuration query to a hardware device in an optical network;

means for receiving a response to the device configuration query identifying at least one network device type associated with the hardware device;

means for transmitting at least one status query to the hardware device responsive to the response to the device configuration query, the status query formatted according to at least one of the network device types associated with the hardware device identified in the response to the device configuration query;

means for receiving a response to the status query that includes status information associated with the hardware device;

means for determining a health condition identifier associated with the hardware device responsive to the status information, the health condition identifier is configured to indicate a health performance-level associated with the hardware device; and means for generating an audit report that includes an identification of the network device configuration associated with hardware device received in the response to the device configuration query, and the health condition identifier associated with the hardware device.

29. The system of claim 28, wherein the audit report includes recommendations associated with the management of the optical network.

30. The system of claim 28, wherein the health condition identifier having an acceptable category, an unacceptable category, or a questionable category, each to indicate a different performance-level associated with the hardware device.

31. The system of claim 28, wherein said hardware device is a portion of said optical network's infrastructure.

32. The system of claim 28, wherein the health condition identifier is configured to indicate a correlation between identified exceptions to net rules and a total possible exceptions to the net rules, where the net rules include one or more of predefined thresholds of acceptable tolerances for characteristics associated with the hardware device.

33. The system of claim 28, includes means for transmitting at least the device configuration query or the status query through at least a portion of the optical network.

34. The system of claim 28, includes means for receiving the responses from the hardware device through at least a portion of the optical network.

35. The system of claim 28, wherein said device configuration query requests information related to the part number and location in said optical network of said hardware device.

36. The system of claim 28, wherein said status query is determined by database reference to the network device type of said hardware device.

* * * * *